(12) United States Patent
Hsu

(10) Patent No.: US 10,402,026 B2
(45) Date of Patent: Sep. 3, 2019

(54) CONDUCTIVE MESH AND TOUCH SENSOR

(71) Applicant: INT TECH CO., LTD., Hsinchu County (TW)

(72) Inventor: Kuo-Cheng Hsu, Taichung (TW)

(73) Assignee: INT TECH CO., LTD., Zhubei, Hsinchu (TW)

( * ) Notice: Subject to any disclaimer, the term of this patent is extended or adjusted under 35 U.S.C. 154(b) by 0 days.

(21) Appl. No.: 15/680,665

(22) Filed: Aug. 18, 2017

(65) Prior Publication Data

US 2019/0056816 A1    Feb. 21, 2019

(51) Int. Cl.
  *G06F 3/045*    (2006.01)
  *G06F 3/044*    (2006.01)
  *G06F 3/041*    (2006.01)

(52) U.S. Cl.
  CPC ........... *G06F 3/044* (2013.01); *G06F 3/0412* (2013.01); *G06F 2203/04111* (2013.01); *G06F 2203/04112* (2013.01)

(58) Field of Classification Search
  USPC ....................................... 345/173, 174, 175
  See application file for complete search history.

(56) References Cited

U.S. PATENT DOCUMENTS

| | | | | |
|---|---|---|---|---|
| 9,921,699 B2* | 3/2018 | Chung | .................... | G06F 3/044 |
| | | | | 345/173 |
| 2015/0234495 A1* | 8/2015 | Lo | ......................... | G06F 3/0416 |
| | | | | 345/174 |
| 2015/0268776 A1* | 9/2015 | Ishizaki | ................ | G06F 3/0412 |
| | | | | 345/174 |
| 2015/0346874 A1* | 12/2015 | Park | ........................ | G06F 3/044 |
| | | | | 345/174 |
| 2016/0048248 A1* | 2/2016 | Na | .......................... | G06F 3/044 |
| | | | | 345/174 |

(Continued)

FOREIGN PATENT DOCUMENTS

| | | |
|---|---|---|
| CN | 102334091 A | 1/2012 |
| TW | 201423534 A | 6/2014 |

(Continued)

OTHER PUBLICATIONS

First Office Action and search report dated Jun. 12, 2018, issued in counterpart Taiwanese Patent Application No. 106132296, (9 pages) with English translation (3 pages).

*Primary Examiner* — Thuy N Pardo
(74) *Attorney, Agent, or Firm* — Juan Carlos A. Marquez; Marquez IP Law Office, PLLC

(57) ABSTRACT

A touch sensor includes first sensing lines and second sensing lines. The first sensing lines are arranged in a first direction, and each of the first sensing lines includes one or more first mesh electrode. The second sensing lines are arranged in a second direction and intersecting the plurality of first sensing lines, and each of the second sensing lines includes one or more second mesh electrode. Each of the first mesh electrode and the second mesh electrode includes conductive frames and bridging electrodes. The conductive frames are apart from each other, wherein each of the conductive frames has an aperture. Each of the bridging electrodes has two ends connected to two respective ones of the conductive frames, and a junction of any one of the bridging electrodes and the respective conductive frames is a three-way junction.

20 Claims, 10 Drawing Sheets

(56) References Cited

U.S. PATENT DOCUMENTS

| | | | |
|---|---|---|---|
| 2016/0085339 A1* | 3/2016 | Yashiro | G06F 3/044 345/174 |
| 2016/0179259 A1* | 6/2016 | Watanabe | G06F 3/044 345/174 |
| 2016/0195983 A1* | 7/2016 | Miyake | G06F 3/0416 345/174 |
| 2016/0202842 A1* | 7/2016 | Uriu | G06F 3/044 345/175 |
| 2017/0147107 A1* | 5/2017 | Ishizaki | G06F 3/0412 345/173 |
| 2018/0182818 A1* | 6/2018 | Kim | H01L 27/323 345/173 |

FOREIGN PATENT DOCUMENTS

| | | |
|---|---|---|
| TW | 201432799 A | 8/2014 |
| TW | 201716949 A | 5/2017 |

* cited by examiner

CONDUCTIVE MESH AND TOUCH SENSOR

BACKGROUND

Electronic device such as smart phone, notebook computer or the like has adopted touch sensors as input interface due to its slim size and intuitive interaction between the user and the electronic device. The touch sensors are normally integrated with the electronic device in its display surface, and thus may deteriorate display quality of the electronic device.

SUMMARY

Embodiments of the present invention provide a conductive mesh. The conductive mesh includes a first mesh electrode and a second mesh electrode. The second mesh electrode partially overlaps the first mesh electrode, and is electrically disconnected from the first mesh electrode. Each of the first mesh electrode and the second mesh electrode includes a plurality of conductive frames apart from each other, and a plurality of bridging electrodes. Each of the conductive frames has an aperture. Each of the bridging electrodes has two ends connected to two respective ones of the conductive frames, and a junction of any one of the bridging electrodes and the respective conductive frame is a three-way junction.

In some embodiments, each of the bridging electrodes of the first mesh electrode intersects the respective one of the bridging electrodes of the second mesh electrode.

In some embodiments, the first mesh electrode and the second mesh electrode are misaligned, and the conductive frames of the first mesh electrode and the conductive frames of the second mesh electrode do not overlap each other.

In some embodiments, each of the conductive frames includes a plurality of segments connected to one another, and each of the three-way junctions is formed by one of the ends of the bridging electrode and two ends of two segments of the respective conductive frame.

In some embodiments, each of the segments is a curved segment.

In some embodiments, each of the conductive frames includes a circular frame.

In some embodiments, each of the apertures includes a circular aperture.

In some embodiments, each of the segments is a straight segment.

In some embodiments, each of the conductive frames includes a square frame.

In some embodiments, each of the apertures includes a square aperture.

In some embodiments, the conductive frames and the bridging electrodes of the first mesh electrode are formed from a first patterned conductive layer, and the conductive frames and the bridging electrodes of the second mesh electrode are formed from a second patterned conductive layer.

In some embodiments, the bridging electrodes of the first mesh electrode are formed from a first patterned conductive layer, and the conductive frames of the first mesh electrode and the conductive frames and the bridging electrodes of the second mesh electrode are formed from a second patterned conductive layer.

In some embodiments, the first mesh electrode further includes a plurality of through vias electrically connected to the bridging electrodes and the conductive frames of the first mesh electrode.

In some embodiments, each of the conductive frames is connected to an adjacent conductive frame through only one bridging electrode.

In some embodiments, the plurality of conductive frames have substantially the same shape and size. Some embodiments of the present invention provide a touch sensor. The touch sensor includes a plurality of first sensing lines and a plurality of second sensing lines. The first sensing lines are arranged in a first direction, wherein each of the first sensing lines includes one or more first mesh electrode. The second sensing lines are arranged in a second direction and intersecting the first sensing lines, wherein each of the second sensing lines includes one or more second mesh electrode. Each of the first mesh electrode and the second mesh electrode includes a plurality of conductive frames and bridging electrodes. The conductive frames are apart from each other, wherein each of the conductive frames has an aperture. Each of the bridging electrodes has two ends connected to two respective ones of the conductive frames, and a junction of any one of the bridging electrodes and the respective conductive frames is a three-way junction.

In some embodiments, a portion of the bridging electrodes of the first mesh electrodes of the first sensing lines and the second mesh electrodes of the second sensing lines extend along a third direction, and another portion of the bridging electrodes of the first mesh electrodes of the first sensing lines and the second mesh electrodes of the second sensing lines extend along a fourth direction.

In some embodiments, each of the conductive frames is connected to an adjacent conductive frame through only one bridging electrode.

In some embodiments, the plurality of conductive frames have substantially the same shape and size. Some embodiments of the present invention provide a touch display panel. The touch display panel includes a touch sensor and a plurality display devices. The touch sensor includes a plurality of first sensing lines and a plurality of second sensing lines. The first sensing lines are arranged in a first direction, wherein each of the first sensing lines includes one or more first mesh electrode. The second sensing lines are arranged in a second direction and intersecting the first sensing lines, wherein each of the second sensing lines includes one or more second mesh electrode. Each of the first mesh electrode and the second mesh electrode includes a plurality of conductive frames and bridging electrodes. The conductive frames are apart from each other, wherein each of the conductive frames has an aperture. Each of the bridging electrodes has two ends connected to two respective ones of the conductive frames, and a junction of any one of the bridging electrodes and the respective conductive frames is a three-way junction. The display devices are under the touch sensor, wherein the display devices are misaligned with the touch sensor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
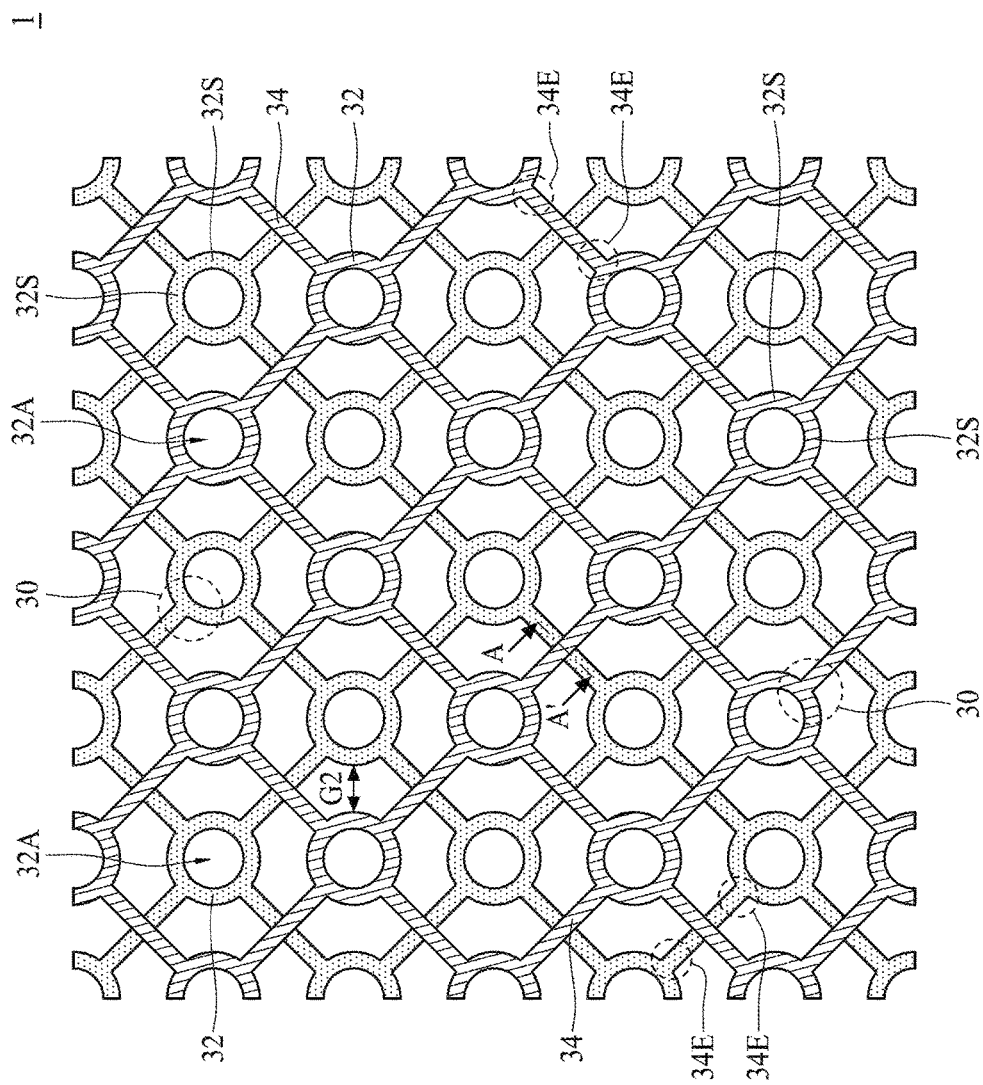
FIG. 1 is a schematic diagram of a conductive mesh in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

Further, spatially relative terms, such as "beneath," "below," "lower," "above," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. The terms such as "first", "second" and "third" when used herein do not imply a sequence or order unless clearly indicated by the context.

In some embodiments of the present disclosure, a conductive mesh and a touch sensor with the conductive mesh are provided. The conductive mesh includes three-way junction formed by a conductive frame and a bridging electrode. The three-way junction may be a three-way end joint, i.e., three ends of three lines are jointed. The three-way junction helps to provide uniform resistance, and thus touch sensitivity can be improved. The conductive frame with a curved edge is able to increase power line uniformity when sensing, and thus touch sensitivity can be further improved. The conductive frame with a curved edge is also less prone to peel, and thus reliability of the touch sensor can be improved. The curved conductive frames can further help to increase pattern accuracy after photolithography and etching, and thus can increase aperture ratio of the conductive mesh. Accordingly, the invisibility of the conductive mesh can be improved.

Figure 1A:
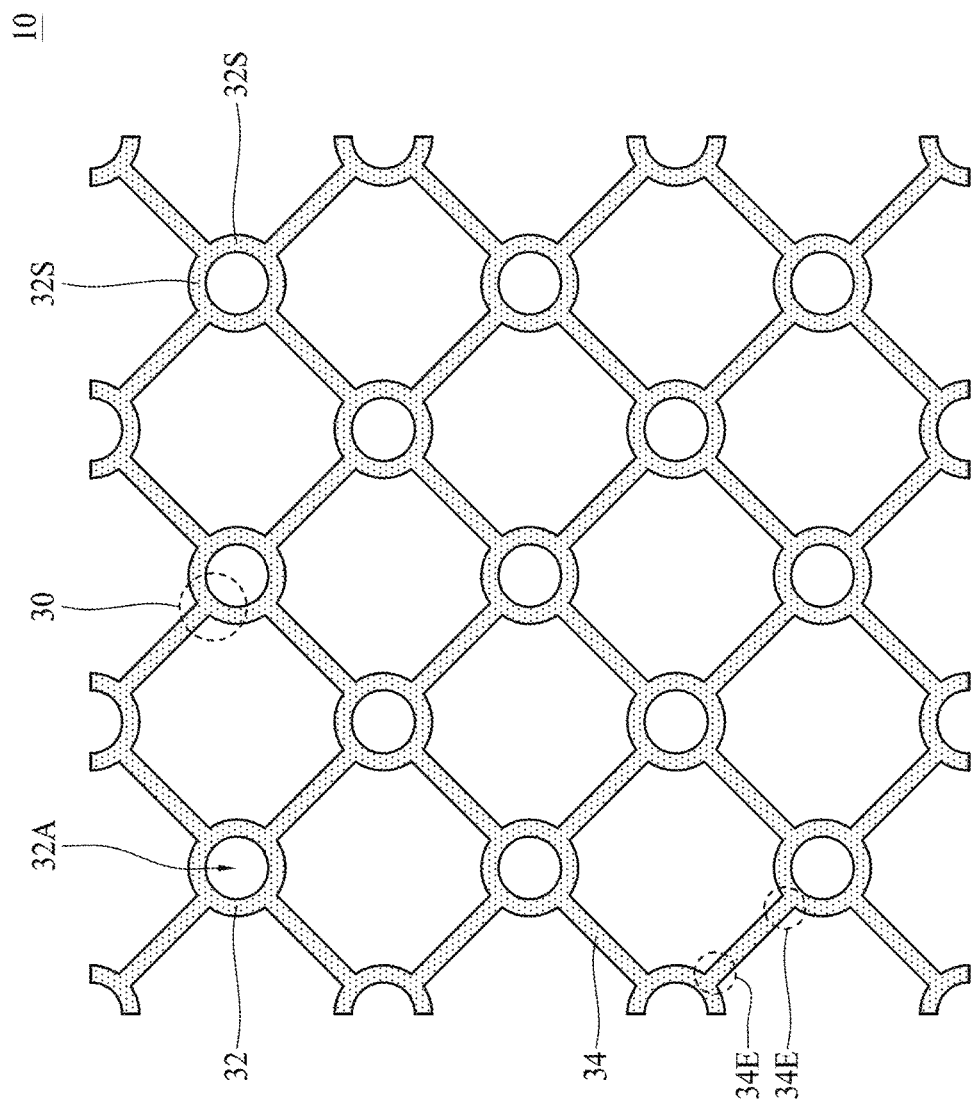
FIG. 1A is a schematic diagram of a first mesh electrode in accordance with some embodiments of the present disclosure.
Figure 1B:
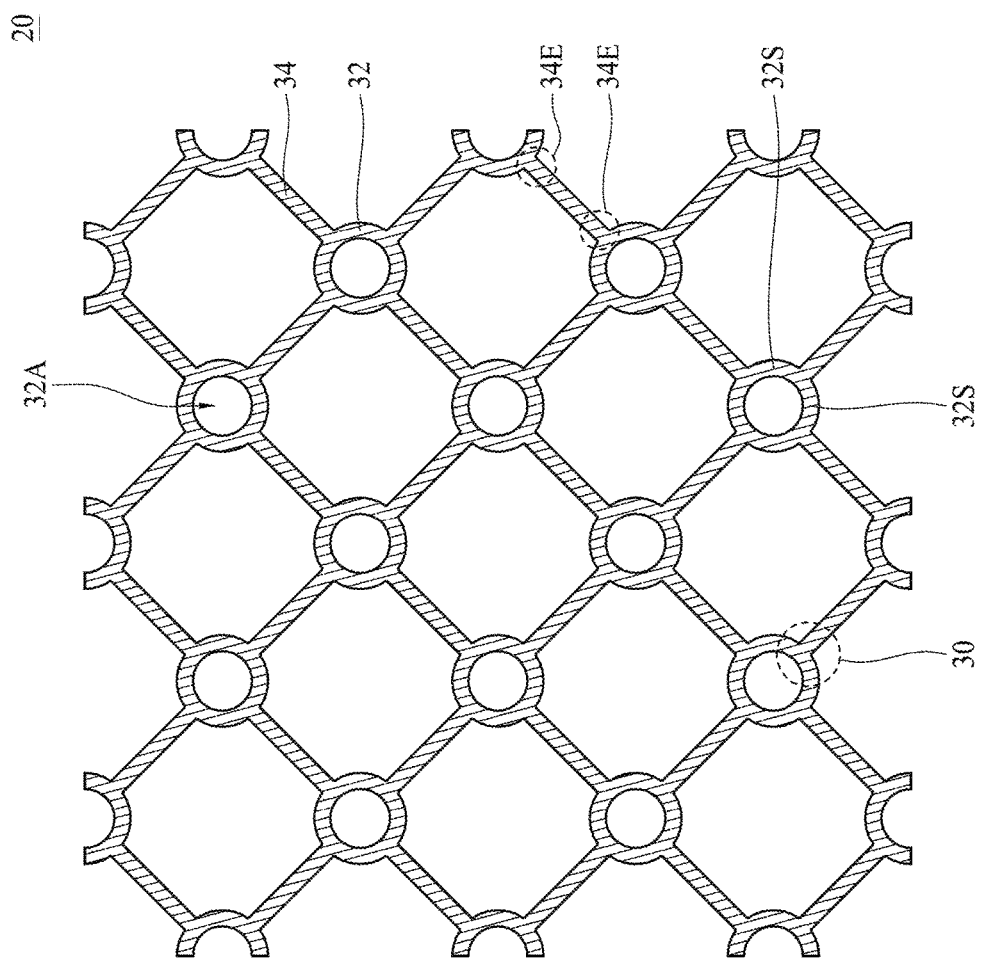
FIG. 1B is a schematic diagram of a second mesh electrode in accordance with some embodiments of the present disclosure.

FIG. 1 is a schematic diagram of a conductive mesh in accordance with some embodiments of the present disclosure, FIG. 1A is a schematic diagram of a first mesh electrode in accordance with some embodiments of the present disclosure, and FIG. 1B is a schematic diagram of a second mesh electrode in accordance with some embodiments of the present disclosure. As shown in FIG. 1, FIG. 1A and FIG. 1B, the conductive mesh 1 includes a first mesh electrode 10 and a second mesh electrode 20. The first mesh electrode 10 and the second mesh electrode 20 are partially overlapping, and electrically disconnected from each other. Each of the first mesh electrode 10 and the second mesh electrode 20 includes a plurality of conductive frames 32 and bridging electrodes 34. The conductive frames 32 of the first mesh electrode 10 are apart from each other, and the conductive frames 32 of the second mesh electrode 20 are apart from each other. Each of the conductive frames 32 has an aperture 32A. In some embodiments, the conductive frames 32 are formed from non-transparent conductive material such as metal or metal alloy. In some embodiments, the bridging electrodes 34 are formed from non-transparent conductive material such as metal or metal alloy. The aperture 32A is through the conductive frame 32, and configured to allow light to pass through. Each of the bridging electrodes 34 has two ends 34E connected to two respective ones of the conductive frames 32, and a junction of any one of the bridging electrodes 34 and the respective conductive frame 32 is a three-way junction 30. The conductive frames 32 are electrically connected to one another through the bridging electrodes 34. In some embodiments, each of the conductive frames 32 is connected to an adjacent conductive frame 32 through only one bridging electrode 34, increasing aperture ratio of the conductive mesh 1.

In some embodiments, each of the bridging electrodes 34 of the first mesh electrode 10 intersects the respective one of the bridging electrodes 34 of the second mesh electrode 20. In some embodiments, the bridging electrodes 34 are intersected perpendicularly, but are not limited thereto. In some embodiments, the bridging electrodes 34 of the first mesh electrode 10 and the bridging electrodes 34 of the second mesh electrode 20 are partially overlapping, but are electrically disconnected from each other. In some embodiments, the first mesh electrode 10 and the second mesh electrode 20 have the same pattern, and are misaligned. By way of example, the second mesh electrode 20 is shifted with respect to the first mesh electrode 10. In such a case, the conductive frames 32 of the first mesh electrode 10 and the conductive frames 32 of the second mesh electrode 20 do not overlap each other, but the bridging electrodes 34 of the first mesh electrode 10 intersect the respective bridging electrodes 34 of the second mesh electrode 20.

In some embodiments, the conductive frames 32 may have the same size, shape and equal line width. In some embodiments, each of the conductive frames 32 includes a plurality of segments 32S connected to one another to form a ring-shaped frame, and each three-way junctions 30 is formed by one end 34E of the bridging electrode 34 and two ends of two segments 32S of the respective conductive frame 32. In some embodiments, the segments 32S of the same conductive frame 32 may have the same shape and size, but are orientated in different directions. In some embodiments, each of the segments 32S is a curved segment. In some embodiments, each of the conductive frames 32 has a shape symmetrical with respect to its center point. By way of example, the conductive frame 32 is a circular frame, and the aperture 32A is a circular aperture. In contrast to a conductive frame with an acute edge or a tip, the circular frame is less prone to peel.

As shown in FIG. 1, FIG. 1A and FIG. 1B, the junction of each conductive frame 32 and the respective bridging electrode 34 is a three-way junction 30. Compared to a four-way junction, the pattern of the three-way junction 30 can be controlled more accurately because it has fewer turning points. In some embodiments, the conductive frames 32 and the bridging electrode 34 are formed by patterning one or more conductive layer. Therefore, the pattern of the three-way junction 30, after photolithography and etching, has fewer material residues protruding out from the three-way junction 30. The three-way junction 30 with fewer material residues not only has more uniform resistance and power line distribution, but also has higher aperture ratio.

Figure 2A:
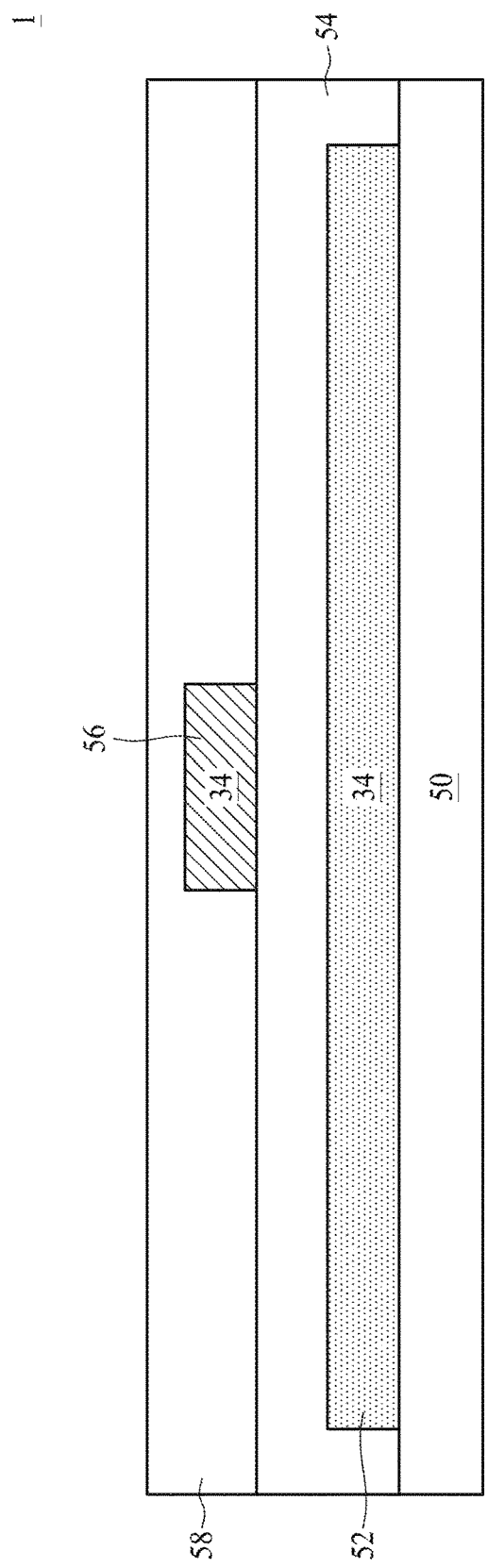
FIG. 2A is a cross-sectional view of a conductive mesh along a line A-A' in accordance with some embodiments of the present disclosure.

FIG. 2A is a cross-sectional view of a conductive mesh along a line A-A' in accordance with some embodiments of the present disclosure. As shown in FIG. 2A and FIG. 1, the conductive mesh 1 may be formed over a substrate 50. The substrate 50 may be a rigid substrate such as glass, or a flexible substrate such as a film. In some embodiments, the conductive frames 32 and the bridging electrodes 34 of the first mesh electrode 10 are formed from a first patterned conductive layer 52, and the conductive frames 32 and the bridging electrodes 34 of the second mesh electrode 20 are formed from a second patterned conductive layer 56. The first patterned conductive layer 52 and the second patterned conductive layer 56 may include the same conductive material or different materials. The first patterned conductive layer 52 and the second patterned conductive layer 56 each may be single-layered or multi-layered. In some embodiments, the material of the first patterned conductive layer 52 or the second patterned conductive layer 56 may include metal or metal alloy such as Molybdenum (Mo), Aluminum (Al), Titanium (Ti), alloy thereof, or other suitable conductive material. In some embodiments, the conductive mesh 1 may further include an insulative layer 54 disposed between the first patterned conductive layer 52 and the second patterned conductive layer 56. In some embodiments, the conductive mesh 1 may further include a passivation layer 58 over the second patterned conductive layer 26.

Figure 2B:
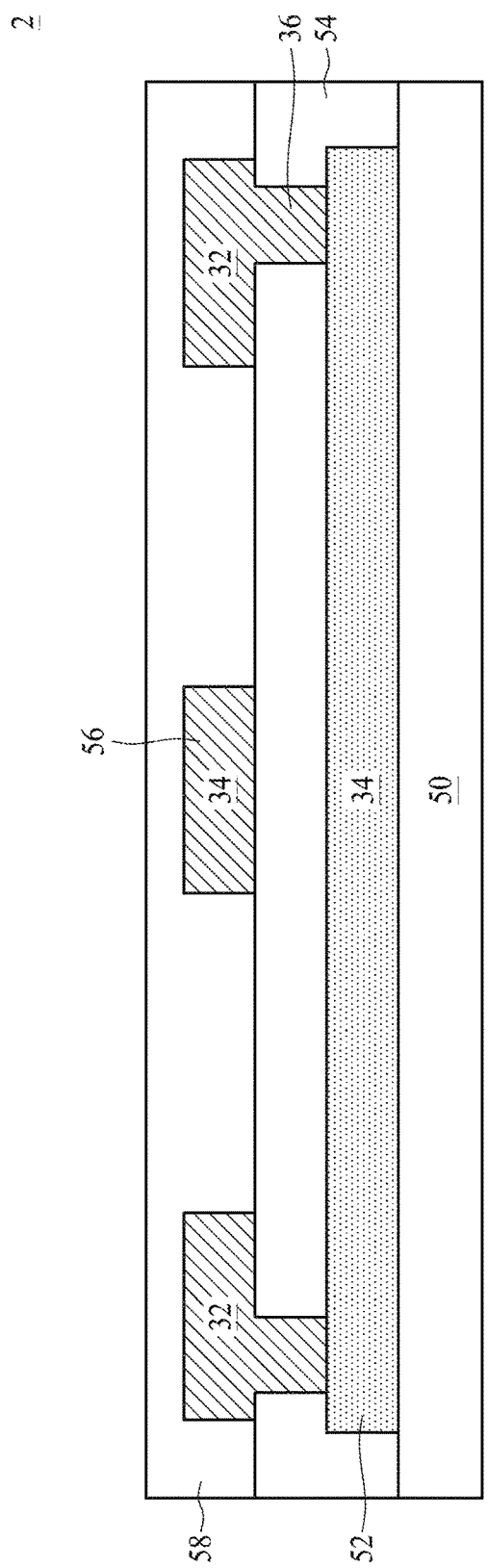
FIG. 2B is a cross-sectional view of a conductive mesh in accordance with some embodiments of the present disclosure.

FIG. 2B is a cross-sectional view of a conductive mesh in accordance with some embodiments of the present disclosure. As shown in FIG. 2B and FIG. 1, the bridging electrodes 34 of the first mesh electrode 10 are formed from the first patterned conductive layer 52, and the conductive frames 32 of the first mesh electrode 10 and the conductive frames 32 and the bridging electrodes 34 of the second mesh electrode 20 are formed from the second patterned conductive layer 56. In some embodiments, the first mesh electrode 10 further includes a plurality of through vias 36 penetrating through the insulative layer 54. The through vias 36 are electrically connected to the bridging electrodes 34 and the conductive frames 32 of the first mesh electrode 10. In some embodiments, the through vias 36 and the conductive frames 32 may be formed from the same patterned conductive layer such as the second patterned conductive layer 56. In some embodiments, the through vias 36 and the conductive frames 32 may be formed from different patterned conductive layers.

The conductive mesh of the present disclosure is not limited to the above-mentioned embodiments, and may have other different embodiments. To simplify the description and for the convenience of comparison between each of the embodiments of the present disclosure, the identical components in each of the following embodiments are marked with identical numerals. For making it easier to compare the difference between the embodiments, the following description will detail the dissimilarities among different embodiments and the identical features will not be redundantly described.

Figure 3:
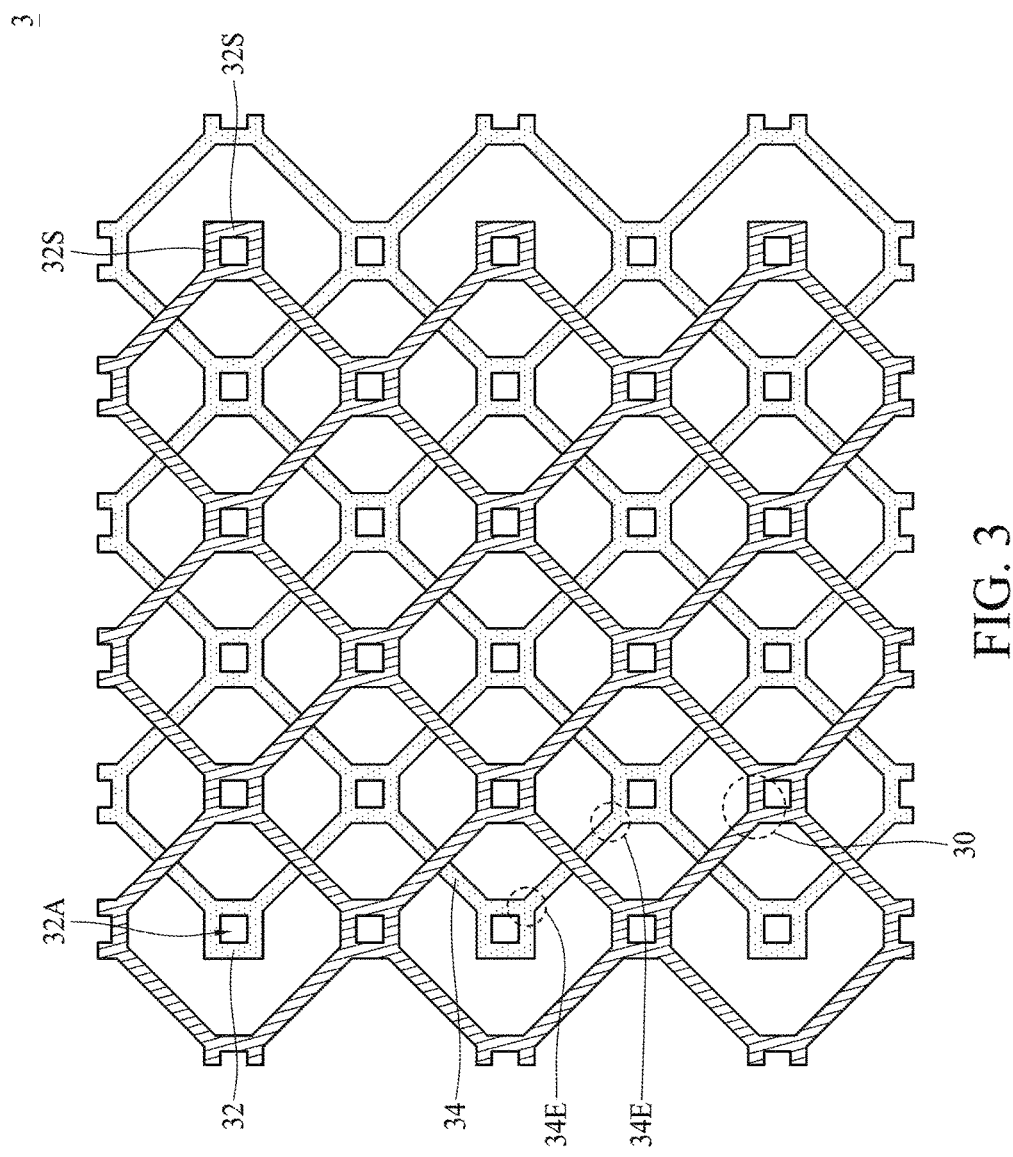
FIG. 3 is a schematic diagram of a conductive mesh in accordance with some embodiments of the present disclosure.

FIG. 3 is a schematic diagram of a conductive mesh in accordance with some embodiments of the present disclosure. As shown in FIG. 3, in contrast to the conductive mesh 1 of FIG. 1, each of the segments 32S is a straight segment. In some embodiments, each of the conductive frames 32 has a shape symmetrical with respect to its center point. By way of example, the conductive frame 32 is a square frame, and the aperture 32A is a square aperture. Similar to the conductive mesh 1, the junction of any one of the bridging electrodes 34 and the respective conductive frame 32 of the conductive mesh 3 is a three-way junction 30. The three-way junction 30 has more uniform resistance, and higher aperture ratio.

Figure 4:
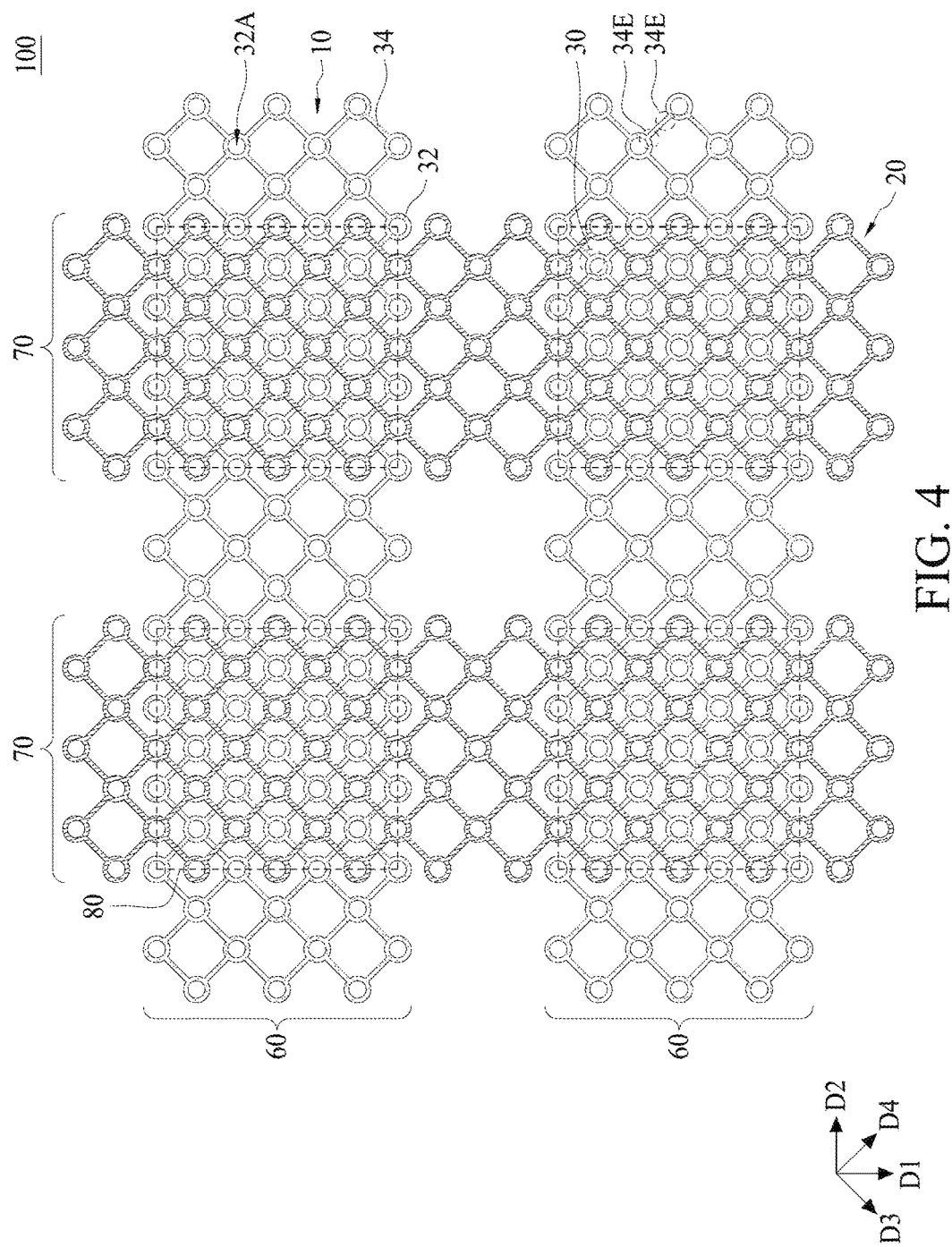
FIG. 4 is a schematic diagram of a touch sensor in accordance with some embodiments of the present disclosure.

FIG. 4 is a schematic diagram of a touch sensor in accordance with some embodiments of the present disclosure. As shown in FIG. 4, the touch sensor 100 includes a plurality of first sensing lines 60 and second sensing lines 70. The first sensing lines 60 are arranged in a first direction D1. The second sensing lines 70 are arranged in a second direction D1. In some embodiments, the first direction D1 and the second direction D2 may be substantially perpendicular to each other. For example, the first direction D1 may be the vertical direction in FIG. 4, and the second direction D2 may be the horizontal direction in FIG. 4. The touch sensor 100 may include a plurality of conductive meshes 80 arranged in an array. In some embodiments, the conductive mesh 80 may include the conductive mesh 1, 2 or 3 as illustrated in FIG. 1, FIG. 1A, FIG. 1B, FIG. 2A, FIG. 2B or FIG. 3. Each of the first sensing lines 60 may include one or more first mesh electrode 10 and each of the second sensing lines 70 may include one or more second mesh electrode 20 as illustrated in FIG. 1, FIG. 1A, FIG. 1B, FIG. 2A, FIG. 2B or FIG. 3. In some embodiments, the touch sensor 100 may be a capacitive touch sensor. In some embodiments, the first mesh electrodes 10 and the second mesh electrodes 20 may be configured as sensing pads such as X pads and Y pads to detect the coordinates of touch input points.

Each of the first mesh electrode 10 and the second mesh electrode 20 includes a plurality of conductive frames 32 and bridging electrodes 34. The conductive frames 32 are apart from each other, and each of the conductive frames 32 has an aperture 32A. Each of the bridging electrodes 34 has two ends 34E connected to two respective ones of the conductive frames 32, and a junction of any one of the bridging electrodes 34 and the respective conductive frames 32 is a three-way junction 30.

In some embodiments, a portion of the bridging electrodes 34 of the first mesh electrodes 10 of the first sensing lines 60 and the second mesh electrodes 20 of the second sensing lines 70 extend along a third direction D3. Another portion of the bridging electrodes 34 of the first mesh electrodes 10 of the first sensing lines 60 and the second mesh electrodes 20 of the second sensing lines 70 extend along a fourth direction D4. In some embodiments, the third direction D3 is substantially perpendicular to the fourth direction D4, and the third direction D3 is diagonal to the first direction D1.

The detailed features of the conductive mesh 80, the first mesh electrode 10 and the second mesh electrode 20 are described in the aforementioned descriptions, and thus are not redundantly described.

In some embodiments, the touch sensor 100 may be integrated with a display device to form a touch display device. The touch sensor 100 with the three-way junction 30 has more uniform resistance, and thus touch sensitivity can be improved. The touch sensor 100 with the three-way junction 30 also has higher aperture ratio, and thus the invisibility of the conductive mesh 80 can be improved. The conductive frame 32 with a curved edge helps to increase uniformity of power line distribution, and thus touch sensitivity can be further improved.

The touch sensor 100 can be driven in either a self-capacitive or a mutual-capacitive manner. Since the first mesh electrode 10 and the second mesh electrode 20 have the same pattern, when the touch sensor 100 is driven in a mutual-capacitive manner, the first sensing lines 60 and the second sensing lines 70 can be arbitrarily selected to deliver transmitting signals (Tx) and to obtain receiving signals (Rx) without requiring different driving methods.

In some embodiments, the touch sensor 100 may be a flexible touch sensor. The conductive frame 32 with a curved edge is less prone to peel than a conductive frame with an acute edge or a tip. Furthermore, the conductive frame 32 with a curved edge is less prone to break when being stretched in case the touch sensor 100 is in a folded or bended state. Accordingly, the reliability of the touch sensor 100 can be improved.

Figure 5:
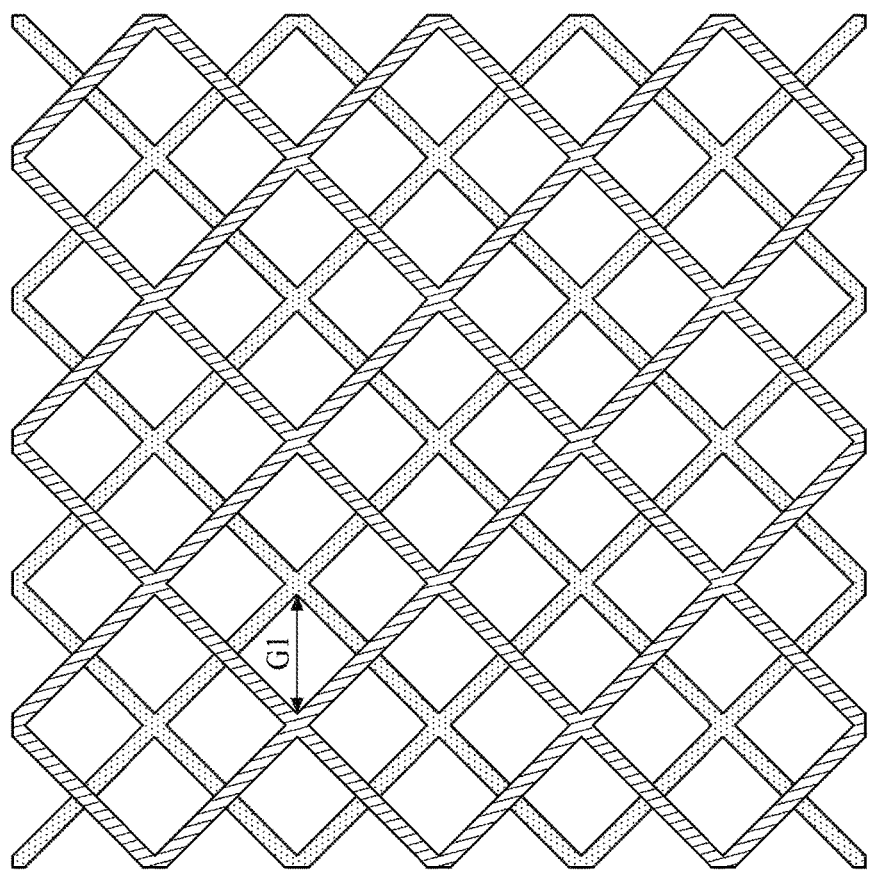
FIG. 5 is a schematic diagram of a touch sensor in accordance with a comparative embodiment of the present disclosure.

FIG. 5 is a schematic diagram of a touch sensor in accordance with a comparative embodiment of the present disclosure. As shown in FIG. 5, two adjacent sensing pads of the conductive mesh 4 of the comparative embodiment have a distance G1. In contrast to the conductive mesh 4 of the comparative embodiment, the patterns of the conductive frame 32 of the first mesh electrode 10 and an adjacent conductive frame 32 of the second mesh electrode 20 of the conductive mesh 1 are configured to have a distance G2 smaller than the distance G1. Accordingly, the sensing capacitance of the conductive mesh 1 with smaller distance G2 is larger than that of the conductive mesh 4 of the comparative embodiment.

Figure 6:
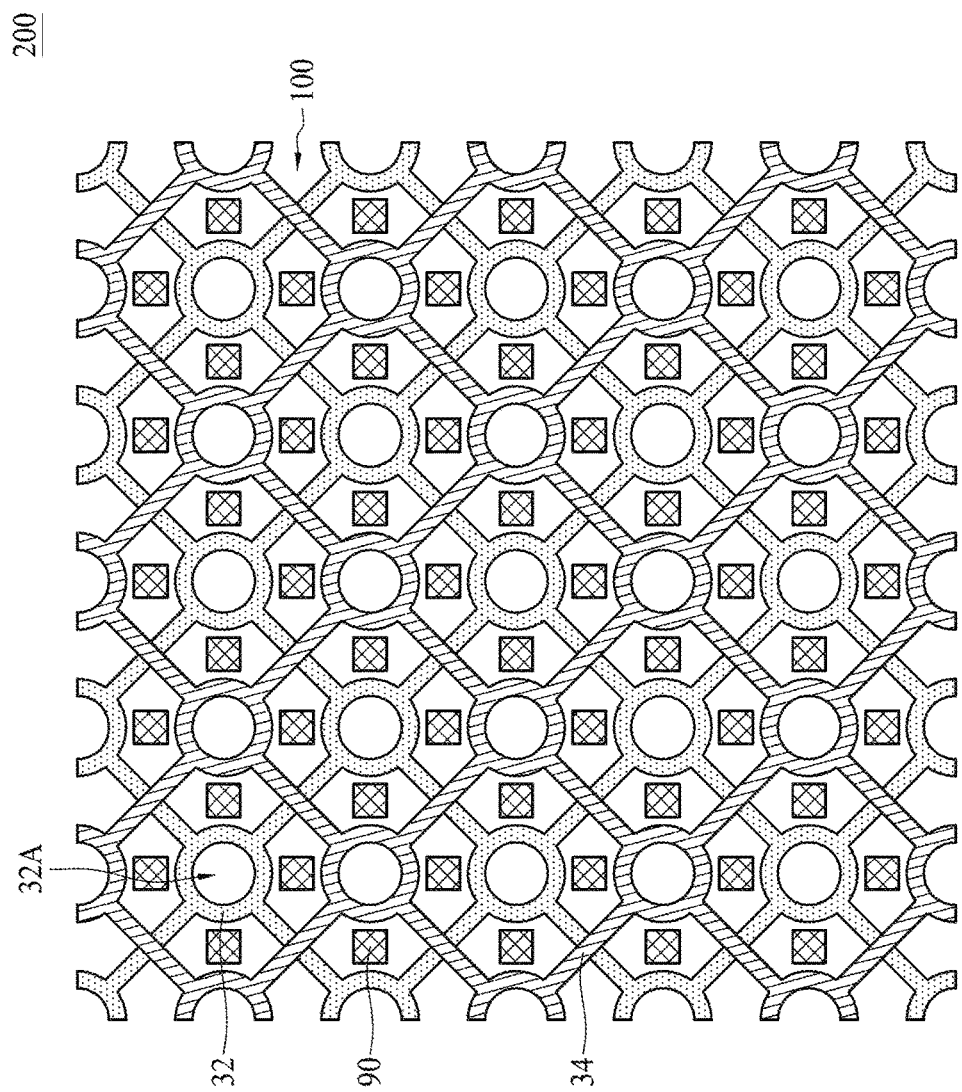
FIG. 6 is a schematic diagram of a touch display panel in accordance with some embodiments of the present disclosure.

FIG. 6 is a schematic diagram of a touch display panel in accordance with some embodiments of the present disclosure. As shown in FIG. 6, FIG. 1 and FIG. 4, the touch display panel 200 includes a touch sensor 100 and a plurality of display devices 90. The touch sensor 100 is detailed in the above embodiments, and is not redundantly described. The display devices 90 are disposed under the touch sensor 100. In some embodiments, the display devices 90 may include light-emitting devices such as organic light-emitting diodes (OLEDs) or other display devices. In some embodiments, the OLEDs may be formed by photolithography and etching techniques so as to increase resolution of the touch display panel 200. In some embodiments, the resolution of the touch display panel 200 may be over 800 PPI (pixel per inch), 1000 PPI or even higher. In some embodiments, the display devices 90 are misaligned with the touch sensor 100 such that light emitted by the display devices 90 will not be blocked by the touch sensor 100. By way of example, each of the display devices 90 may be disposed corresponding to a space between a conductive frame 32 of the first mesh electrode 10 and an adjacent conductive frame 32 of the second mesh electrode 20. The first mesh electrode 10 and the second mesh electrode 20 have the same pattern, and thus the display devices 90 may be equally spaced and uniformly distributed to improve display quality. In some embodiments, more than one display device 90 may be disposed corresponding to a space between a conductive frame 32 of the first mesh electrode 10 and an adjacent conductive frame 32 of the second mesh electrode 20 to increase the resolution.

Figure 7:
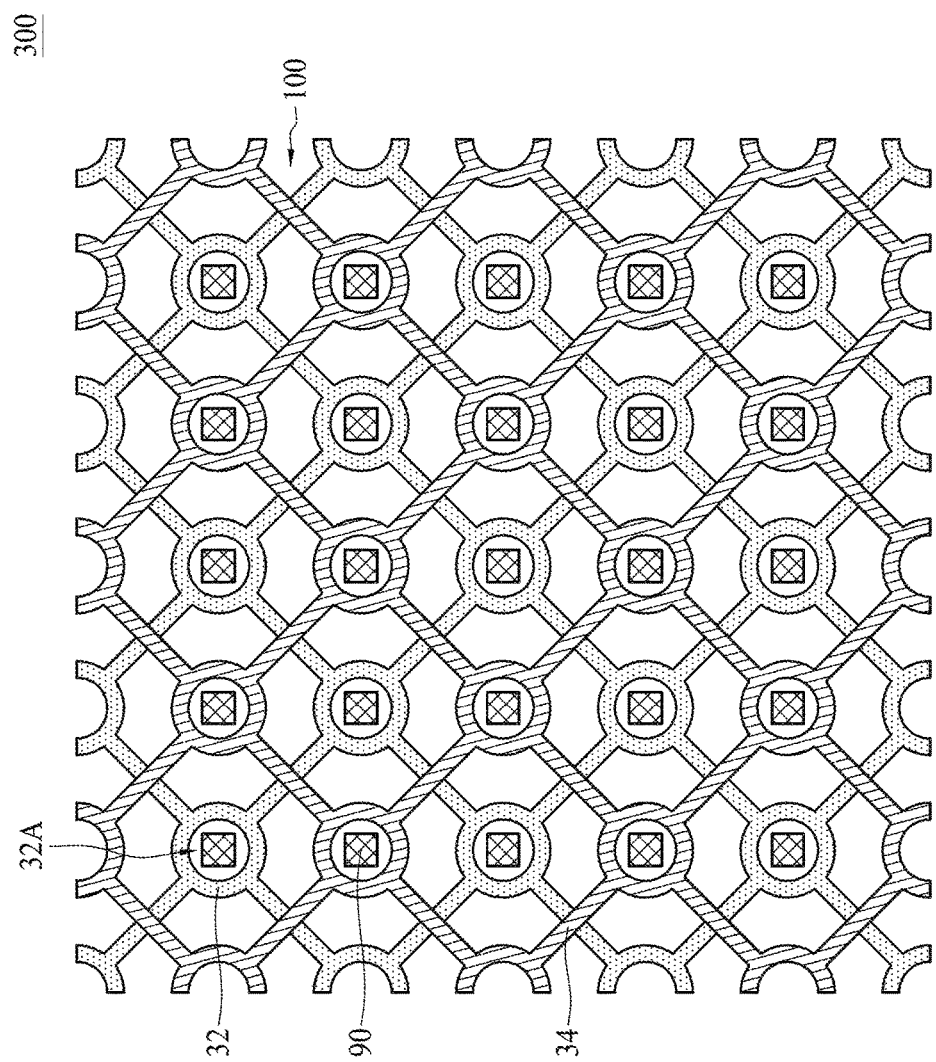
FIG. 7 is a schematic diagram of a touch display panel in accordance with some embodiments of the present disclosure.

FIG. 7 is a schematic diagram of a touch display panel in accordance with some embodiments of the present disclosure. As shown in FIG. 7, FIG. 1 and FIG. 4, the display devices 90 of the touch display panel 300 may be disposed corresponding to the apertures 32A of the conductive frames 32, respectively. In some alternative embodiments, the display devices 90 of the touch display panel 300 may be disposed corresponding to both the space between adjacent conductive frames 32 and the apertures 32A of the conductive frames 32.

In some embodiments of the present disclosure, the touch sensor and the conductive mesh include three-way junction formed by symmetric conductive frame and bridging electrodes. The three-way junction formed by a conductive frame and a bridging electrode helps to provide uniform resistance and uniform power line distribution, and thus touch sensitivity can be improved. The conductive frame with a curved edge is less prone to peel, and thus reliability of the touch sensor can be improved. Furthermore, the curved conductive frames can further help to increase pattern accuracy after photolithography and etching, and thus can increase aperture ratio of the conductive mesh. Accordingly, the invisibility of the conductive mesh can be improved. The touch sensor may be integrated into a display panel such as a flexible display panel. The display devices may be misaligned with the conductive mesh of the touch sensor to increase display quality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A conductive mesh, comprising:
   a first mesh electrode;
   a second mesh electrode partially overlapping the first mesh electrode, and electrically disconnected from the first mesh electrode, wherein each of the first mesh electrode and the second mesh electrode comprises:
a plurality of conductive frames apart from each other, wherein each of the conductive frames has an aperture; and
a plurality of bridging electrodes, wherein each of the bridging electrodes has two ends connected to two respective ones of the plurality of conductive frames, and a junction of any one of the bridging electrodes and the respective conductive frame is a three-way junction; and
a plurality of display devices disposed respectively corresponding to the apertures of the conductive frames of the first mesh electrode and the second mesh electrode.

2. The conductive mesh of claim 1, wherein each of the bridging electrodes of the first mesh electrode intersects the respective one of the bridging electrodes of the second mesh electrode.

3. The conductive mesh of claim 1, wherein the first mesh electrode and the second mesh electrode are misaligned, and the conductive frames of the first mesh electrode and the conductive frames of the second mesh electrode do not overlap each other.

4. The conductive mesh of claim 1, wherein each of the plurality of conductive frames includes a plurality of segments connected to one another, and each of the three-way junctions is formed by one of the ends of the bridging electrode and two ends of two segments of the respective conductive frame.

5. The conductive mesh of claim 4, wherein each of the plurality of segments is a curved segment.

6. The conductive mesh of claim 5, wherein each of the plurality of conductive frames includes a circular frame.

7. The conductive mesh of claim 6, wherein each of the plurality of apertures includes a circular aperture.

8. The conductive mesh of claim 4, wherein each of the plurality of segments is a straight segment.

9. The conductive mesh of claim 8, wherein each of the plurality of conductive frames includes a square frame.

10. The conductive mesh of claim 9, wherein each of the plurality of apertures includes a square aperture.

11. The conductive mesh of claim 1, wherein the conductive frames and the bridging electrodes of the first mesh electrode are formed from a first patterned conductive layer, and the conductive frames and the bridging electrodes of the second mesh electrode are formed from a second patterned conductive layer.

12. The conductive mesh of claim 1, wherein the bridging electrodes of the first mesh electrode are formed from a first patterned conductive layer, and the conductive frames of the first mesh electrode and the conductive frames and the bridging electrodes of the second mesh electrode are formed from a second patterned conductive layer.

13. The conductive mesh of claim 12, wherein the first mesh electrode further comprises a plurality of through vias electrically connected to the bridging electrodes and the conductive frames of the first mesh electrode.

14. The conductive mesh of claim 1, wherein each of the conductive frames is connected to an adjacent conductive frame through only one bridging electrode.

15. The conductive mesh of claim 1, wherein each of the plurality of conductive frames have substantially the same shape and size.

16. A touch sensor, comprising:
a plurality of first sensing lines arranged in a first direction, wherein each of the first sensing lines comprises one or more first mesh electrode;
a plurality of second sensing lines arranged in a second direction and intersecting the plurality of first sensing lines, wherein each of the second sensing lines comprises one or more second mesh electrode,
wherein each of the first mesh electrode and the second mesh electrode comprises:
a plurality of conductive frames apart from each other, wherein each of the conductive frames has an aperture; and
a plurality of bridging electrodes, wherein each of the bridging electrodes has two ends connected to two respective ones of the plurality of conductive frames; and
a plurality of display devices disposed respectively corresponding to the apertures of the conductive frames of the first mesh electrode and the second mesh electrode.

17. The touch sensor of claim 16, wherein a portion of the bridging electrodes of the first mesh electrodes of the first sensing lines and the second mesh electrodes of the second sensing lines extend along a third direction, and another portion of the bridging electrodes of the first mesh electrodes of the first sensing lines and the second mesh electrodes of the second sensing lines extend along a fourth direction.

18. The touch sensor of claim 16, wherein each of the conductive frames is connected to an adjacent conductive frame through only one bridging electrode.

19. The touch sensor of claim 16, wherein each of the plurality of conductive frames have substantially the same shape and size.

20. A touch display panel, comprising:
a touch sensor, comprising:
a plurality of first sensing lines arranged in a first direction, wherein each of the first sensing lines comprises one or more first mesh electrode; and
a plurality of second sensing lines arranged in a second direction and intersecting the plurality of first sensing lines, wherein each of the second sensing lines comprises one or more second mesh electrode,
wherein each of the first mesh electrode and the second mesh electrode comprises:
a plurality of conductive frames apart from each other, wherein each of the conductive frames has an aperture; and
a plurality of bridging electrodes, wherein each of the bridging electrodes has two ends connected to two respective ones of the plurality of conductive frames; and
a plurality of display devices under the touch sensor, wherein the plurality of display devices are disposed respectively corresponding to the apertures of the conductive frames of the first mesh electrode and the second mesh electrode.

* * * * *